April 3, 1928.
W. R. GREEN
UNDERSLUNG TIRE CARRIER
Filed May 8, 1926
1,664,856
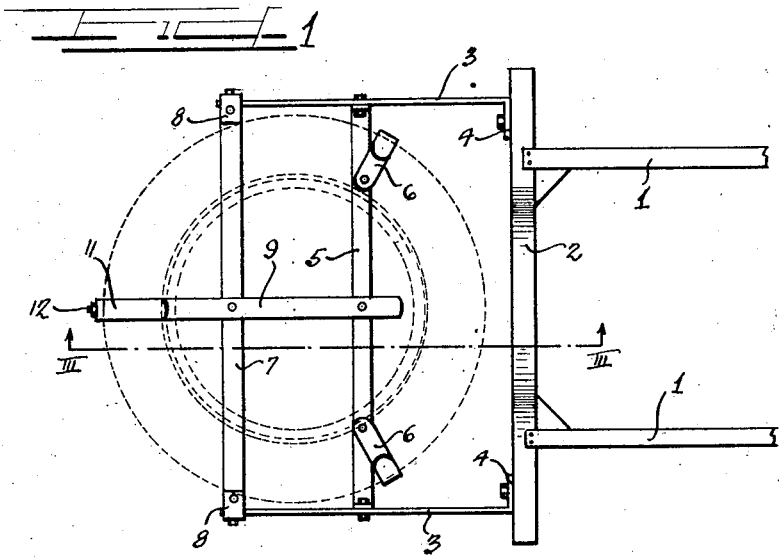
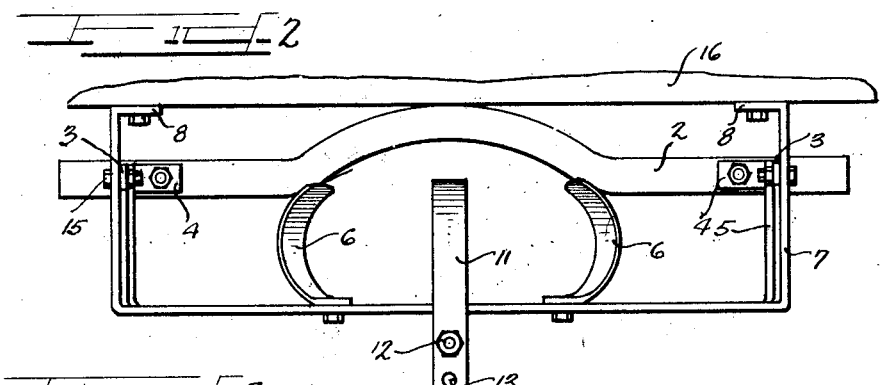
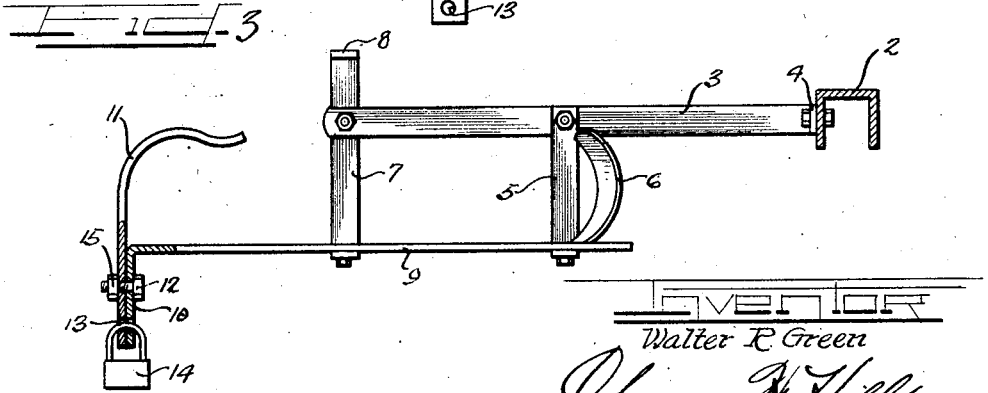
INVENTOR
Walter R. Green
BY Charles H. Hills
ATTYS Patented Apr. 3, 1928.

1,664,856

UNITED STATES PATENT OFFICE.

WALTER R. GREEN, OF CHICAGO, ILLINOIS; ALBERT H. GREEN, EXECUTOR OF SAID WALTER R. GREEN, DECEASED, ASSIGNOR TO INTERNATIONAL STAMPING COMPANY, OF CHICAGO, ILLINOIS, A CORPORATION OF ILLINOIS.

UNDERSLUNG TIRE CARRIER.

Application filed May 8, 1926. Serial No. 107,589.

This invention relates to an underslung tire carrier with reference to which the tire can be readily slipped on or off.

It is an object of this invention to provide a carrier especially adapted for aplication to a commercial car; that is, a car having a wagon body for transporting commodities.

The invention comprises the novel structure and combinations hereinafter described and more particularly pointed out and defined in the appended claims.

In the accompanying drawings, which illustrate a preferred embodiment of this invention and in which similar reference numerals refere to similar features in the different views:

Figure 1 is a top plan view of the carrier showing its attachment to the chassis of a car.

Figure 2 is an enlarged fragmentary rear elevational view of the carrier showing its attachment to the body of the car as well as to the chassis.

Figure 3 is an enlarged view taken substantially upon the line III—III of Figure 1.

Referring to the drawing, the reference numerals 1 indicate the side beams of the chassis of an automobile. These side beams are connected to the rear transverse member 2 which is usually channel-shaped in cross-section. A pair of parallel and longitudinally extending brackets 3 are attached to the rear transverse member 2. The brackets 3 are preferably provided with right-angled attaching flanges 4 which are bolted to a flange of the channel member 2. A U-shaped member 5 is attached to the brackets 3, depending therefrom, and a pair of tire retaining shoes or members 6 are attached to the bottom thereof. A second U-shaped member 7 is also attached to the brackets 3 and depends therefrom; the bottom of this second U-shaped member 7 lying in the same horizontal plane as the bottom of the first U-shaped member 5. Together they form the bottom of the carrier. The second U-shaped member 7, however, projects above the brackets 3 as clearly shown in Figures 2 and 3. The upwardly projecting ends of this second U-shaped member are provided with attaching flanges 8 which are bolted to the bottom of the body 16 of the car. A longitudinal strip 9 is attached to the bottom portions of the U-shaped members 5 and 7 and projects outwardly beyond the rear member 7. This outwardly projecting portion is provided with a depending flange 10 upon which a tire retaining shoe or member 11 is pivoted by a bolt 12 which is welded in the flange 10. Below the bolt 12 the shoe 11 and flange 10 are provided with registering apertures 13 for receiving the hasp of a padlock 14 whereby the shoe 11 may be locked upon the flange.

In order to insert a tire in the carrier or remove it therefrom, it is necessary to remove the padlock 14 and remove the nut 15 on the bolt 12 whereby the shoe 11 may be removed from the flange. In a reverse manner the shoe may again be applied to the flange 10.

It will be appreciated that the carrier involving this invention is primarily adapted for an automobile in which the body extends a considerable distance beyond the rear transverse member 2 making it necessary to attach the carrier both to the chassis and body of the car.

I claim as my invention:

1. In an underslung tire carrier, a plurality of longitudinally extending brackets adapted for attachment to the chassis, a plurality of U-shaped members attached to said brackets, one of said U-shaped members being also adapted for attachment to the body of a vehicle, a longitudinal member secured to said U-shaped members and a tire-retaining shoe removably secured on said longitudinal member.

2. In an automobile having a chassis and a body extending beyond the chassis, an underslung tire carrier disposed entirely under said body and comprising a plurality of brackets attached to said chassis, tire-retaining means carried by said brackets, and means for attaching the brackets to said body.

3. In an automobile having a chassis and a body extending rearwardly of the chassis, an underslung tire carrier disposed entirely under said body and comprising a plurality of brackets attached to the chassis, a U-shaped member attached to said brackets, and having upwardly projecting means attached to said body, and tire-retaining means supported by said brackets.

4. In an automobile having a chassis and a body extending rearwardly of the chassis, a tire carrier therefor comprising a plurality of side brackets attached to said chassis, and a plurality of U-shaped members attached to said brackets, one of said U-shaped members having a plurality of oppositely disposed tire-retaining shoes thereon and one of said U-shaped members extending above said brackets for attachment to said body.

In testimony whereof I have hereunto subscribed my name.

WALTER R. GREEN.